UNITED STATES PATENT OFFICE.

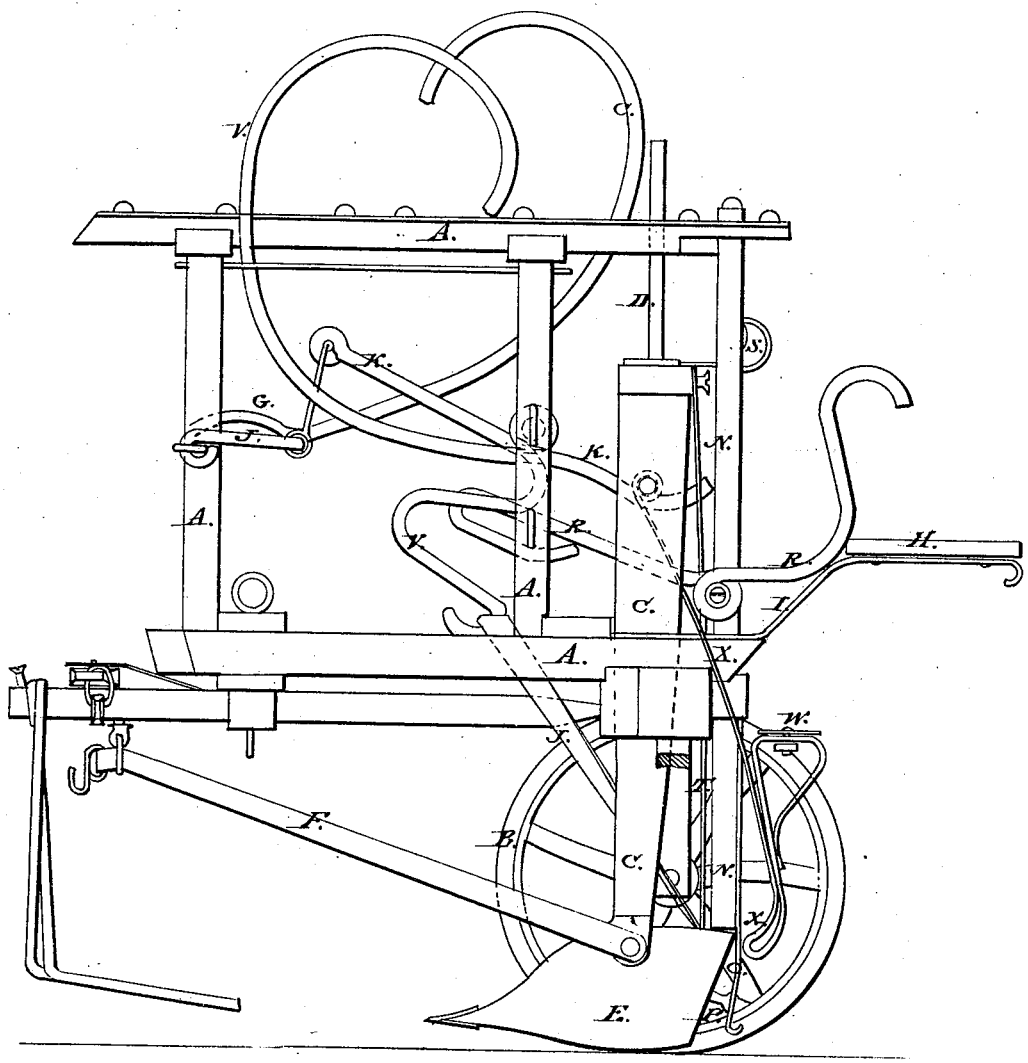

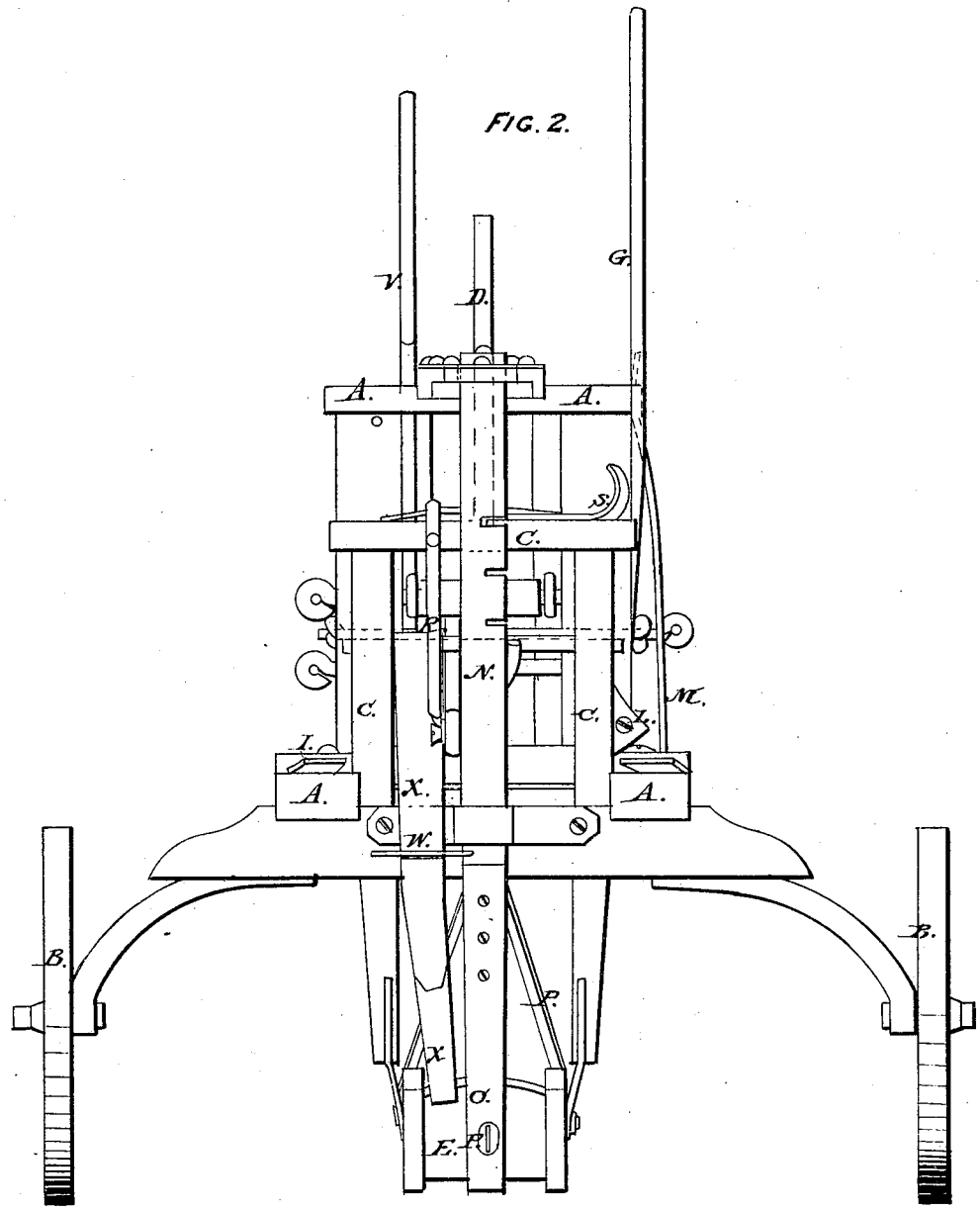

E. L. DORSEY, OF WINSLOW, INDIANA.

Letters Patent No. 88,018, dated March 23, 1869.

IMPROVED ROAD-SCRAPER.

The Schedule referred to in these Letters Patent and making part of the same.

*To all whom it may concern:*

Be it known that I, E. L. DORSEY, of Winslow, in the county of Pike, and in the State of Indiana, have invented certain new and useful Improvements in Road-Scrapers; and do hereby declare that the following is a full, clear, and exact description thereof, reference being had to the accompanying drawings, and to the letters of reference marked thereon.

The nature of my invention consists in the construction and general arrangement of a "road-scraper," which will be hereinafter fully set forth.

In order to enable others skilled in the art to which my invention appertains, to make and use the same, I will now proceed to describe its construction and operation, referring to the annexed drawings, which form a part of this specification, and in which—

Figure 1 is a side elevation, with one of the wheels removed, and

Figure 2 is a rear view, with the driver's seat removed.

A represents the frame-work of the machine mounted on two wheels, B B.

A vertical-sliding frame, C, in front of the axle in the main frame A, is steadied by a rod, D, which is secured to and passes through a hole in the upper centre-beam of the stationary frame A.

At the lower end of the sliding frame C, the scraper E is hung or pivoted.

From the lower ends of the frame C, where the scraper is pivoted, two straps, or belts, F F, connect with the tongue, so as to bring the draught directly on the scraper.

The sliding frame C is raised by means of the lever G, on the right side of the machine, which is pivoted at the front end of the frame A, and extends within convenient reach of the driver's seat, H, in the rear of the machine.

The seat H is supported by bars I I, extending from the main frame, as seen in fig. 1.

The lever G, being lowered, acts upon a ring or bail, J, in the front part of the frame A; and this ring is connected with a lever, K, which is pivoted at a suitable point in the frame A, and its rear end extends toward the rear, into the sliding frame C, supporting the same.

By this means the frame C is raised up and held by the catch L, on the side of the frame A, the lever G being pressed under said catch by the spring-guide M.

In rear of the sliding frame C, and in the main frame A, is a sliding bar, N, which, at its lower end, is provided with a spring, O, extending downward.

This spring is provided with a hole, through which a hook, P, from the rear side of the scraper E, projects.

The sliding bar N may be raised to any height desired, by means of the lever R, thus raising the rear of the scraper E, and it is held at any height desired, by an arm, S, which is pivoted to the upper side of the sliding frame C, and can be inserted in any one of a series of notches in the side of the bar N.

From the upper face of the scraper E, a strap, or belt, T, connects with the upper end of the sliding frame C, preventing the scraper from turning entirely upside down; and another strap, or belt, U, also connects the scraper with a lever, V, pivoted at a suitable point in the main frame A, and extending on its left side toward the rear, so as to be reached by the operator.

By means of the lever V, the operator can at any time raise the rear part of the scraper and dump it.

From a suitable point on the sliding frame C, a spring, X, is suspended, which is provided with a step, W, for the driver to place his foot upon when he desires to use it. The lower end of the spring X is bent inwardly, and it is used to assist in dumping the scraper.

This machine is designed to be used on the hind wheels of any ordinary wagon, or the team can be applied to the machine directly, if mounted on wheels, as herein represented.

In operation, it is only necessary to shake the lever R, and the scraper will soon be filled.

By placing the lever G under the catch L, the sliding frame C and scraper E are raised from the ground.

The sliding bar N is then let down, which raises the front end of the scraper, as the lower end of said bar rests on the rear portion of the scraper.

The bar N is held down by the arm S being placed in the upper notch on the same.

The machine is then driven to the place of dumping, when the bar N is raised, and secured as high as possible.

If the team is now started, the scraper E will dump itself; but if it should require any assistance to do so, the driver can either pull on the lever V, or put his foot on the step W, when the scraper will at once empty itself.

Having thus fully described my invention,

What I claim as new, and desire to secure by Letters Patent, is—

1. The arrangement of the sliding frame C, scraper E, strap, or belt T, lever K, ring or bail J, and lever G, all constructed and operating substantially as and for the purposes herein set forth.

2. In combination with the sliding frame C and scraper E, the sliding bar N, spring O, hook P, and lever R, for the purpose of steadying the scraper, preventing it from dumping, and assisting in loading, substantially as herein set forth.

3. The arrangement of the lever V, belt, or strap U, and pivoted scraper E, for the purpose of dumping the latter, substantially as herein set forth.

4. The arrangement, on the sliding frame C, of the spring X and step W, substantially as and for the purposes herein set forth.

In testimony that I claim the foregoing, I have hereunto set my hand, this 9th day of January, 1869.

E. L. DORSEY.

Witnesses:
GEORGE BEE,
A. J. WELLS.